(12) United States Patent
Garavaglia et al.

(10) Patent No.: US 9,071,985 B2
(45) Date of Patent: Jun. 30, 2015

(54) APPARATUS AND METHOD FOR USER EQUIPMENT ASSISTED CONGESTION CONTROL

(71) Applicant: QUALCOMM Incorporated, San Diego, CA (US)

(72) Inventors: Andrea Maria Garavaglia, Nuremberg (DE); Gerardo Giaretta, San Diego, CA (US); Aleksandar Gogic, La Jolla, CA (US); Francesco Pica, San Diego, CA (US); Patrick Stupar, Nuremberg (DE); Lorenzo Casaccia, Rome (IT); David Hugh Williams, Malaga (ES); Arungundram Chandrasekaran Mahendran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 90 days.

(21) Appl. No.: 13/815,116

(22) Filed: Jan. 31, 2013

(65) Prior Publication Data

US 2013/0194919 A1 Aug. 1, 2013

Related U.S. Application Data

(60) Provisional application No. 61/593,610, filed on Feb. 1, 2012.

(51) Int. Cl.
H04W 4/00 (2009.01)
H04W 28/02 (2009.01)
H04N 21/442 (2011.01)

(52) U.S. Cl.
CPC ...... *H04W 28/0268* (2013.01); *H04W 28/0252* (2013.01); *H04W 28/0231* (2013.01);
(Continued)

(58) Field of Classification Search
CPC ............ H04W 28/02; H04W 28/0231; H04W 28/0236; H04W 28/0252; H04W 28/0257; H04W 28/0263; H04W 28/0268

USPC .................................................. 370/229, 252
See application file for complete search history.

(56) References Cited

U.S. PATENT DOCUMENTS

2001/0055971 A1* 12/2001 Irwin et al. ..................... 455/450
2005/0064821 A1* 3/2005 Hedberg et al. ............ 455/67.11
(Continued)

OTHER PUBLICATIONS

3GPP TS 23.401, V11.0.0, "3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP Standard; 3GPP TS 23.401, 3rd Generation Partnership Project (3GPP), Mobile Competence Centre; 650, Route Des Lucioles; F-06921 Sophia-Antipolis Cedex; France, vol. SA WG2, No. V11.0.0, Dec. 14, 2011, pp. 1-287, XP050554520, [retrieved on Dec. 14, 2011].
(Continued)

*Primary Examiner* — Farah Faroul
(74) *Attorney, Agent, or Firm* — Arent Fox LLP

(57) ABSTRACT

A method, an apparatus, and a computer program product for wireless communication are provided in connection with improving QoE in RAN congestion. In one example, a communications device is equipped to indicate a quality control indicator (QCI) for each of a plurality of applications that communicate with a RAN over a bearer, receive information regarding modification of the bearer or additional bearers based on the QCIs, and modify the bearer or additional bearers according to the information to achieve a desired QoE for at least one of the plurality of applications. In another example, a RAN is equipped to receive a QCI for each of a plurality of applications related to a bearer from a UE, and modify the bearer or adding additional bearers for communicating with the UE based on the QCI for each of the plurality of applications to improve QoE at the UE.

35 Claims, 9 Drawing Sheets

(52) U.S. Cl.
CPC ..... *H04W 28/0263* (2013.01); *H04N 21/44209* (2013.01); *H04W 28/0247* (2013.01); *H04W 4/001* (2013.01)

(56) References Cited

U.S. PATENT DOCUMENTS

| | | | |
|---|---|---|---|
| 2006/0067270 A1* | 3/2006 | Gilliland et al. | 370/329 |
| 2007/0259673 A1* | 11/2007 | Willars et al. | 455/453 |
| 2008/0165679 A1* | 7/2008 | Anderson et al. | 370/230 |
| 2010/0034083 A1* | 2/2010 | Prakash et al. | 370/230.1 |
| 2010/0226332 A1* | 9/2010 | Zhou et al. | 370/329 |
| 2011/0235569 A1* | 9/2011 | Huang et al. | 370/315 |
| 2012/0076109 A1* | 3/2012 | Lindholm et al. | 370/331 |
| 2012/0120843 A1* | 5/2012 | Anderson et al. | 370/253 |
| 2012/0202491 A1* | 8/2012 | Fox et al. | 455/435.1 |
| 2012/0224564 A1* | 9/2012 | Paisal et al. | 370/331 |
| 2012/0269167 A1* | 10/2012 | Velev et al. | 370/331 |
| 2012/0289220 A1* | 11/2012 | Yang et al. | 455/422.1 |
| 2013/0084864 A1* | 4/2013 | Agrawal et al. | 455/436 |
| 2013/0088979 A1* | 4/2013 | Bi et al. | 370/252 |
| 2013/0089033 A1* | 4/2013 | Kahn et al. | 370/329 |
| 2013/0159407 A1* | 6/2013 | Koskela et al. | 709/204 |
| 2013/0176975 A1* | 7/2013 | Turanyi et al. | 370/329 |
| 2013/0203342 A1* | 8/2013 | Morioka et al. | 455/7 |
| 2013/0242887 A1* | 9/2013 | Zhu et al. | 370/329 |
| 2014/0029536 A1* | 1/2014 | Tian et al. | 370/329 |
| 2014/0036778 A1* | 2/2014 | Awano et al. | 370/328 |
| 2014/0126406 A1* | 5/2014 | Ibanez et al. | 370/252 |

OTHER PUBLICATIONS

International Search Report and Written Opinion—PCT/US2013/024469—ISA/EPO—Jun. 5, 2013.
Laghari K.U.R., et al., "QoE Aware Service Delivery in Distributed Environment", Advanced Information Networking and Applications (WAINA), 2011 IEEE Workshops of International Conference on, IEEE, Mar. 22, 2011, pp. 837-842, XP031864980, DOI: 10.1109/WAINA.2011.58 ISBN: 978-1-61284-829-7.

* cited by examiner

APPARATUS AND METHOD FOR USER EQUIPMENT ASSISTED CONGESTION CONTROL

CLAIM OF PRIORITY UNDER 35 U.S.C. §119

The present Application for Patent claims priority to Provisional Application No. 61/593,610 entitled "APPARATUS AND METHOD FOR USER EQUIPMENT ASSISTED CONGESTION CONTROL" filed Feb. 1, 2012, and assigned to the assignee hereof and hereby expressly incorporated by reference herein.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system.

The UEs can communicate with the eNBs over one or more radio access bearers (RAB), which can each have specified quality-of-service (QoS) or similar properties. As load at a radio access network (RAN) increases, the RAN can become congested, and a quality of experience (QoE) at a UE can decrease, though related services at the UE still meet the QoS of the related RAB. Such QoE degradation, for example, can manifest in perceived delay in web browsing, file download, call setup, etc. on the UE, choppy video or audio streaming (or decreased quality thereof), and/or the like. Different applications are susceptible to different QoE effects given a level of congestion at the RAN. Some solutions effectuate resource redistribution in the RAN where load information is provided by the RAN to the core wireless network, which can accordingly throttle traffic in view of the congestion in attempted improvement of QoE for one or more services. The throttling required to effectuate the resource redistribution, however, may not be straightforward, and may result in unduly complex and inaccurate operation.

Therefore, methods and apparatuses that provide UE assisted congestion control may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with improving QoE in RAN congestion. In one example, a communications device is equipped to indicate a quality control indicator (QCI) for each of a plurality of applications that communicate with a RAN over a bearer, receive information regarding modification of the bearer or additional bearers based on the QCIs, and modify the bearer or additional bearers according to the information to achieve a desired QoE for at least one of the plurality of applications. In another example, a RAN is equipped to receive a QCI for each of a plurality of applications related to a bearer from a UE, and modify the bearer or adding additional bearers for communicating with the UE based on the QCI for each of the plurality of applications to improve QoE at the UE.

According to a related aspect, a method for providing UE assisted congestion control is provided. The method can include indicating a QCI for each of a plurality of applications that communicate with a RAN over a bearer. Further, the method can include receiving information regarding modification of the bearer or additional bearers based on the QCIs. Moreover, the method may include modifying the bearer or additional bearers according to the information to achieve a desired QoE for at least one of the plurality of applications.

Another aspect relates to a communications apparatus enabled to provide UE assisted congestion control. The communications apparatus can include means for indicating a QCI for each of a plurality of applications that communicate with a RAN over a bearer. Further, the communications apparatus can include means for receiving information regarding modification of the bearer or additional bearers based on the QCIs. Moreover, the communications apparatus can include means for modifying the bearer or additional bearers according to the information to achieve a desired QoE for at least one of the plurality of applications.

Another aspect relates to a communications apparatus. The apparatus can include a processing system configured to indicate a QCI for each of a plurality of applications that communicate with a RAN over a bearer. Further, the processing system may be configured to receive information regarding modification of the bearer or additional bearers based on the QCIs. Moreover, the processing system may further be configured to modify the bearer or additional bearers according to the information to achieve a desired QoE for at least one of the plurality of applications.

Still another aspect relates to a computer program product, which can have a computer-readable medium including code for indicating a QCI for each of a plurality of applications that communicate with a RAN over a bearer. Further, the computer-readable medium may include code for receiving information regarding modification of the bearer or additional bearers based on the QCIs. Moreover, the computer-readable medium can include code for modifying the bearer or additional bearers according to the information to achieve a desired QoE for at least one of the plurality of applications.

According to another related aspect, a method for providing UE assisted congestion control is provided. The method can include receiving a QCI for each of a plurality of applications related to a bearer from a UE. Moreover, the method may include modifying the bearer or adding additional bearers for communicating with the UE based on the QCI for each of the plurality of applications to improve QoE at the UE.

Another aspect relates to a communications apparatus enabled to provide UE assisted congestion control. The communications apparatus can include means for receiving a QCI for each of a plurality of applications related to a bearer from a UE. Moreover, the communications apparatus can include means for modifying the bearer or adding additional bearers for communicating with the UE based on the QCI for each of the plurality of applications to improve QoE at the UE.

Another aspect relates to a communications apparatus. The apparatus can include a processing system configured to receive a QCI for each of a plurality of applications related to a bearer from a UE. Moreover, the processing system may further be configured to modify the bearer or adding additional bearers for communicating with the UE based on the QCI for each of the plurality of applications to improve QoE at the UE.

Still another aspect relates to a computer program product, which can have a computer-readable medium including code for receiving a QCI for each of a plurality of applications related to a bearer from a UE. Moreover, the computer-readable medium can include code for modifying the bearer or adding additional bearers for communicating with the UE based on the QCI for each of the plurality of applications to improve QoE at the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
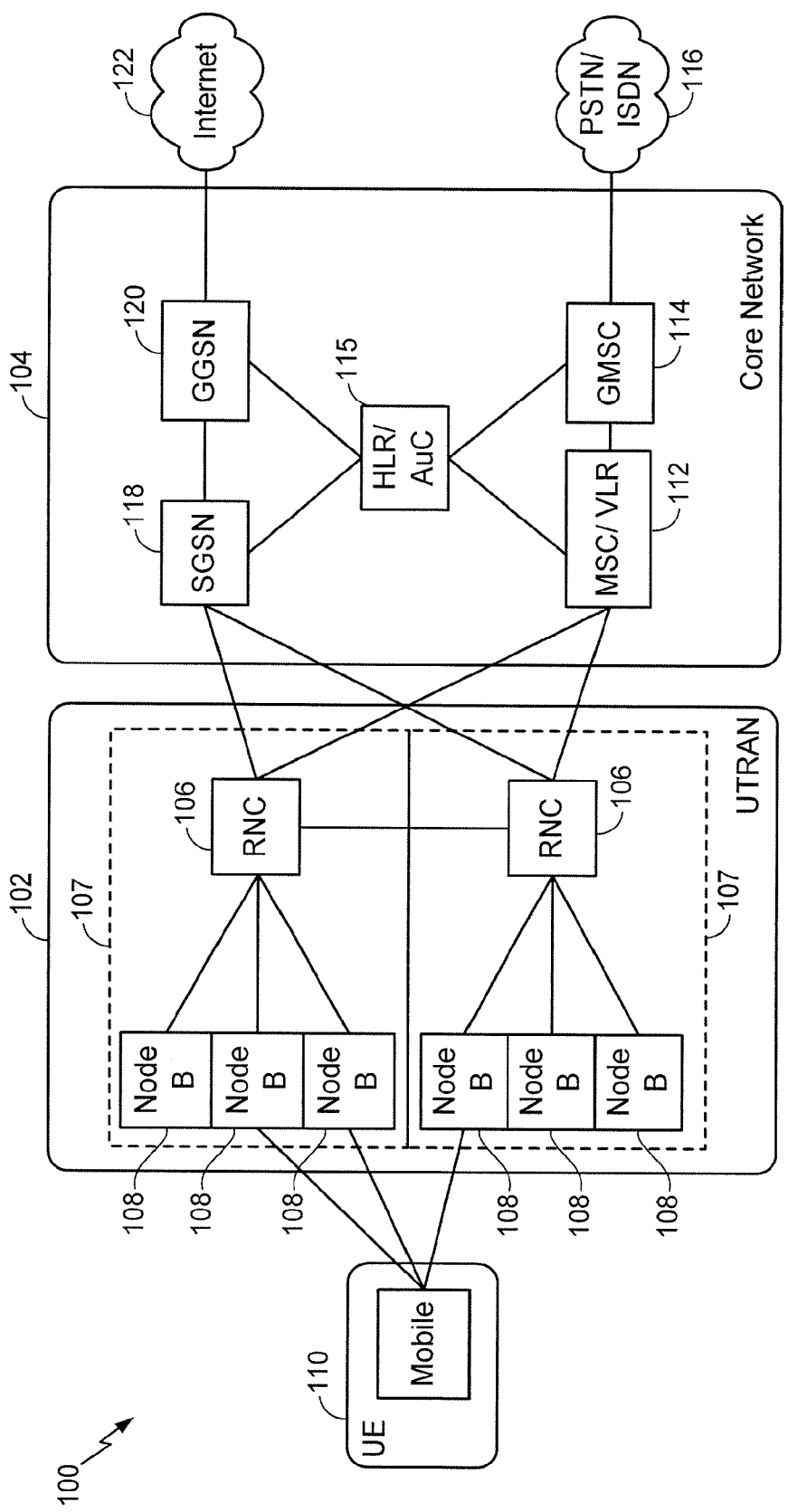
FIG. 1 illustrates a block diagram of an example access network architecture.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to exploring quality-of-service (QoS) usage and policy, and how it links to quality-of-experience (QoE) at a user equipment (UE) to optimize redistribution of resources in a congested radio access network (RAN). The UE can assist the RAN in the redistribution of resources to achieve a certain QoE for certain services operating at the UE. In one example, the UE can map certain applications to use certain quality control indicators (QCI) supported by the core network, where the operator policy allows for such. In this example, the core network receives indication as to which applications of the UE should have resources redistributed in the event of congestion at the RAN. Moreover, in this regard, upon detected congestion (e.g., at the UE or otherwise indicated by the RAN), the UE can explicitly request resource modification using specific QCIs for applications related thereto, and the core network can accordingly modify the resources to improve QoE in RAN congestion.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an"

as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

By way of example and without limitation, the aspects of the present disclosure illustrated in FIG. 1 are presented with reference to a UMTS system 100 employing a W-CDMA air interface and/or CDMA2000 air interface. A UMTS network includes three interacting domains: a Core Network (CN) 104, a UMTS Terrestrial Radio Access Network (UTRAN) 102, and one or more User Equipments (UEs) 110. In an example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC) 112, a Visitor location register (VLR), and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 may also include a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving General Packet Radio Service (GPRS) support node (SGSN) 118 and a gateway GPRS support node (GGSN) 120. GPRS is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

Figure 2:
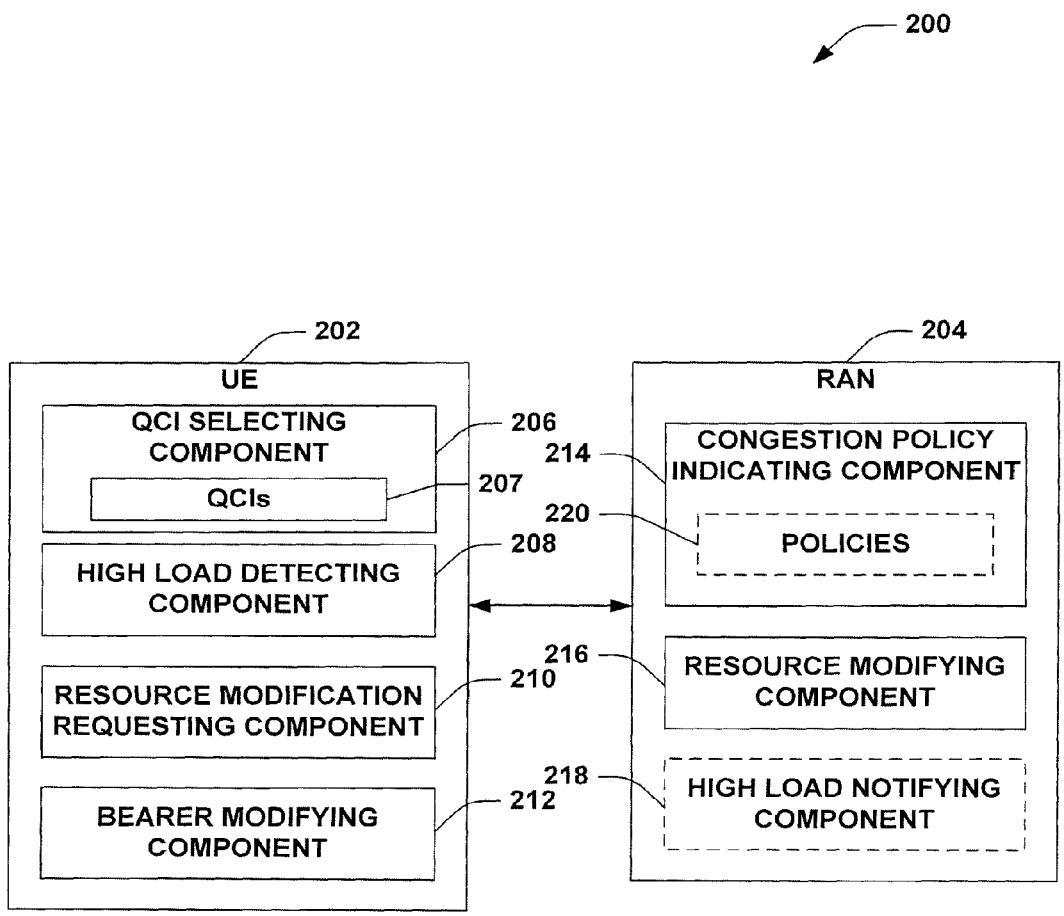
FIG. 2 illustrates an example system for improving quality of experience (QoE) of one or more applications on a user equipment (UE) in case of radio access network (RAN) congestion.

Referring to FIG. 2, a wireless communication system 200 is illustrated that facilitates redistributing resources in RAN congestion control. System 200 includes a UE 202 that communicates with a RAN 204. For example, UE 202 can include a mobile terminal, a modem (or other tethered device), or substantially any device that can communicate with one or more components of a RAN. RAN 204 can include one or more components of a RAN, such as an eNodeB (e.g., eNodeB 108), RNC RNC 106), a gateway (e.g., GMSC 114, GGSN 120, etc.), and/or substantially any component or collection of components that can establish and modify radio resources for one or more UEs.

UE 202 includes a QCI selecting component 206 for associating a QCI 207 to one or more applications for communicating over a bearer with a RAN, and a high load detecting component 208 for detecting high load (e.g., a load as compared to a threshold) or congestion at the RAN. UE 202 also includes a resource modification requesting component 210 for requesting modification of resources in the RAN based in part on detecting a change in QoE, and a bearer modifying component 212 for obtaining and effectuating modifications to one or more bearers based on the request for resource modification.

RAN 204 includes a congestion policy indicating component 214 for communicating one or more supported congestion policies related to specific QCIs, a resource modifying component 216 for obtaining and/or responding to a request to modify resources from a UE based on one or more of the QCIs, and optionally a high load notifying component 218 for indicating high load or congestion at the RAN 204 to one or more UEs.

According to an example, UE 202 can communicate with RAN 204 over one or more radio access bearers (RAB) with an eNodeB or other access point. For example, the RABs can have a specified QoS related to providing data at a guaranteed bit rate (GBR), using best efforts (BE) to communicate data, and/or the like. The UE can select one or more of the bearers for communicating data for certain applications. In one example, QCI selecting component 206 can select a QCI 207 for each application for communicating data related to the application over the bearer. The QCI 207 can correspond to a desired level of quality for the application (e.g., a GBR, a quality or transmission priority relative to other QCIs 207, and/or the like). Upon receiving the QCI indication, RAN 204 can throttle data for the application to achieve the level of quality represented by the QCI 207.

In another example, congestion policy indicating component 214 can communicate information regarding one or more policies 220 to UE 202. The information of the one or more policies 220 can include acceptable QCIs 207, default QCIs 207, etc. for certain application types, and/or the like. In one example, the information of the one or more policies 220 can indicate that the QCIs are constrained to particular applications or types of data. Moreover, in an example, the QCIs indicated in the policies 220 can be more than or less than a default QCI 207 for given applications depending on desired QoE for the applications. The UE 202 can obtain the information regarding the policies (e.g., using a receiver to receive related signals from the RAN 204), and QCI selecting component 206 can select QCIs for applications based on the policies 220 (or select one or more policies 220) to communicate data over the RAN 204. Moreover, the QCI selecting component 206 can notify RAN 204 of its selected QCIs or policies 220.

In either case, the UE 202 can communicate data related to the applications over a bearer with RAN 204, and RAN 204 can throttle data for the applications to the UE 202 based on the selected QCIs or policies 220. In one example, QCI selecting component 206 can initially select desired QCIs 207 that correspond to an indicated importance or desirability for data of a certain application over data of other applications, as described further herein. In this example, further modification of the RAN 204 components may not be necessary. In another example, as described, UE QCI selecting component 206 can select QCIs 207 based on the received policies 220, and/or one or more policies 220 that specify QCIs 207 to be utilized.

While communicating with the RAN 204, high load detecting component 208 can determine load beyond a threshold at the RAN 204, indicating congestion at the RAN 204. In one example, high load detecting component 208 can detect the high load based on determining a decrease in throughput for an application, an indicated degradation in QoE for the application, a failure or error message in the application, and/or the like. Upon detection of the high load, resource modification requesting component 210 can request resource redistribution to cure or mitigate degradation in QoE for one or more applications. Where an initial QCI 207 was specified, or where the QCI 207 can otherwise be modified, resource modification requesting component 210 can indicate modified QCIs 207 for the applications, which can result in the modification of bearers (e.g., adding or removing bearers), modification to bearer parameters *e.g., QoSs or other policies thereof), etc. For example, resource modification requesting component 210 can continue to indicate modified QCIs 207 in an effort to obtain desired QoE for one or more applications (e.g., step up the QCI 207 for applications with higher desired QoE, while stepping down QCIs 207 of applications with lower desired QoE).

In this example, resource modifying component 216 can obtain the request for resource redistribution/bearer modification according to the updated QCIs 207, and can thus communicate bearer modification information to the UE 202. The bearer modification information can facilitate modifying communications to achieve the updated QCIs 207, which can include modification of one or more parameters of a bearer (e.g., QoS or communication policies), additional bearers to be established, bearers to be removed, and/or the like. Bearer modifying component 212 can obtain the bearer modification information, and can accordingly modify bearers at the UE 202, if appropriate. For example, bearer modifying component 212 can participate in a bearer establishment procedure for any new bearers indicated in the modification information.

In one example, high load detecting component 208 can detect the high load at RAN 204 based additionally or alternatively on receiving a notification of high load from high load notifying component 218. The indication can correspond to high load on a particular bearer established between UE 202 and RAN 204, high load at the RAN 204 in general, etc.

In one specific example, UE 202 can execute a file transfer protocol (FTP) application to obtain a sizeable file from a remote source as well as a video conferencing application, which can both use a common bearer with RAN 204 to obtain relevant data. QCI selecting component 206 can initially select or otherwise assign a QCI 207 to the applications (e.g., based on a desired QoE, a comparative QoE between the applications, a QoE specified in one or more policies from RAN 204, etc.). This may avoid degradation in QoE in many cases where RAN 204 starts to become congested. In another example, however, during the file transfer and video conference, high load detecting component 208 may detect a high load at RAN 204, which can be manifested in a detected degradation of video quality in the video conference, a decrease in file transfer speed, an indication from the user of the foregoing, and/or the like.

In this specific example, QCI selecting component 206 can modify QCIs 207 previously selected for the FTP application and/or video conferencing application to improve QoE of the video conference application (as this is likely the more desired application from a QoE standpoint). In one example, QCI selecting component 206 can select the new QCIs 207 based on indicated user preferences in the UE 202 or subscription data from the RAN 204, which can indicate to prefer one application over the other, a degree of preference between applications, a specification of an application as most important, or other indication of a desired QoE. In addition, QCI selecting component 206 can select the QCIs 207 based on a tolerance for variance in resource availability at RAN 204 (e.g., streaming applications can generally use a higher QCI 207 than request/response applications). In another example, QCI selecting component 206 can select QCIs 207 pursuant to one or more other policies 220 indicated by RAN 204. In any case, resource modification requesting component 210 can communicate a resource modification request to RAN 204, which can specify the new QCIs 207 for the application specific data. Resource modifying component 216 can accordingly modify bearers according to the QoE. In one example, this can include establishing a new bearer to handle traffic for the video application, while constraining the bearer corresponding to the FTP data. Resource modifying component 216 can communicate the resource modification to UE 202, and bearer modifying component 212 can perform UE 202 specific actions to handle the modifications, as described.

In an example, the described functions for detecting high load at high load detecting component 208 can be combined with other mechanisms, such as classifying applications according to quality profiles, actively requesting quality parameter modification to RAN, implicitly or explicitly notifying the RAN about the degradation, and/or the like, to enhance such mechanisms to detect the high load. Similarly, high load notifying component 218 can enhance other mechanisms, such as policy engine and control functionalities, deep packet inspection function, etc. to add the information about RAN congestion, which allows, for example, triggering of deeper and complex investigation on the network side, triggering change of policy for users, as well as general modification of quality of service, etc.

In another example, the resource modification requesting component 210 may not need to explicitly request resource modification where the RAN 204 employs deep packet inspection (DPI). In this example, the RAN 204 can prioritize packets related to certain applications for transmission over one or more bearers according to an indicated QCI 207 upon determining a high load at RAN 204.

Figure 3:
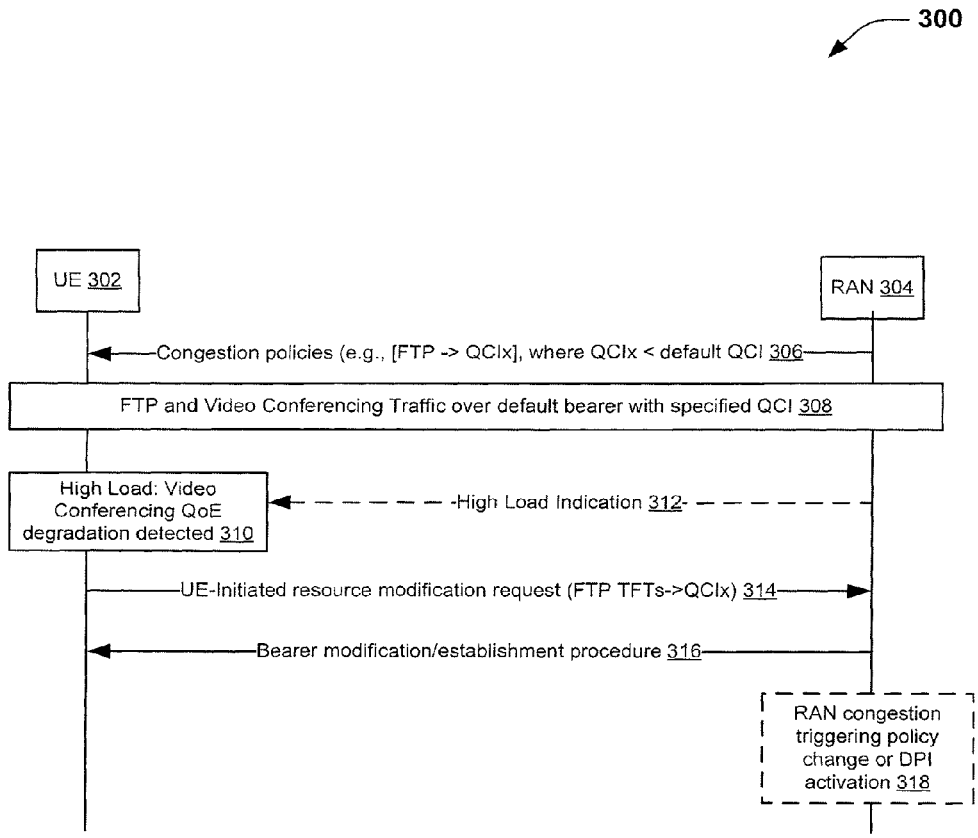
FIG. 3 illustrates an example system for modifying quality control indicators (QCI) of one or more applications to improve QoE in RAN congestion.

Turning now to FIG. 3, an example wireless communication system 300 that facilitates improving QoE at a UE is illustrated. System 300 can include a UE 202 that communicates with a RAN 204, as described. The RAN 204 can become congested, as described, and thus it can be desirable to throttle some application traffic in an effort to contain possible QoE degradation at UE 202. When loading at RAN 204 increases and becomes congested, UE 202 may receive fewer scheduling slots for resources that enable communication with the RAN 204, which can result in perceived QoE degradation caused by delay and possible frame loss. QoS for a related bearer may still be achieved such that the RAN 204 may not realize the loss in QoE, however, and thus the UE 202 can notify RAN 204 of the QoE degradation or otherwise assist the RAN 204 in improving the degradation on a per application basis.

In an example, RAN 204 can communicate congestion policies to the UE 202 at 306. The congestion policies can include an indication of QCIs available for certain applications, default QCI 207 settings for the applications, and/or the like. UE 202 can communicate FTP and video conferencing traffic over a default bearer with RAN 204 using specified QCIs at 308. As described in other examples, UE 202 can select the QCIs based on indicated desirable QoE for certain applications based on user input at the UE 202. This may avoid network congestion impacting QoE in many cases. High load can still be detected in some cases, however; at 310, the high load can be detected as manifested in a video conferencing QoE degradation. As described, this can include detecting a decrease in throughput, a degradation in video rendering quality, an indication from user input at UE 202, and/or the like. Moreover, in one example, a high load indication 312 can be received from the RAN 204. Thus, the RAN 204 can detect the high load based on constrained data rate or similar metrics, and accordingly transmit an indication 312 to the UE 202.

Based on the detected high load and/or QoE degradation, UE 202 can initiate a resource modification request to the RAN 204 at 314. For example, the resource modification request at 314 can indicate a modified QCI for one or more applications to effectuate improved QoE at the one or more applications or other applications. Shown in this example, the resource modification request at 314 specifies an updated QCI for FTP traffic flow template (TFT). The updated QCI can result in less throughput for the FTP application, for example, and the RAN 204 can thus apply the updated QCI by decreasing the allowed FTP traffic and favoring traffic for the video conferencing application, which can be facilitated through modifying bearers associated with the application. Thus, RAN 204 can perform a bearer modification/establishment procedure 316 with UE 202. This can include modifying existing bearers to carry more video conferencing traffic in place of FTP traffic, adding bearers to support additional video conferencing traffic, removing bearers associated with FTP traffic, and/or the like based on the QCIs.

Optionally, at 318, a RAN congestion triggering policy or DPI activation can be employed based on the detected high load. For example, using DPI, the RAN 204 can inspect packets to prefer packets related to applications for which a higher QoE is desired over those for which a lower QoE is acceptable. This can be based on information indicated by the UE 202 regarding preferred applications, based on default information in RAN 204, based on subscription information for the UE 202, and/or the like.

Figure 4:
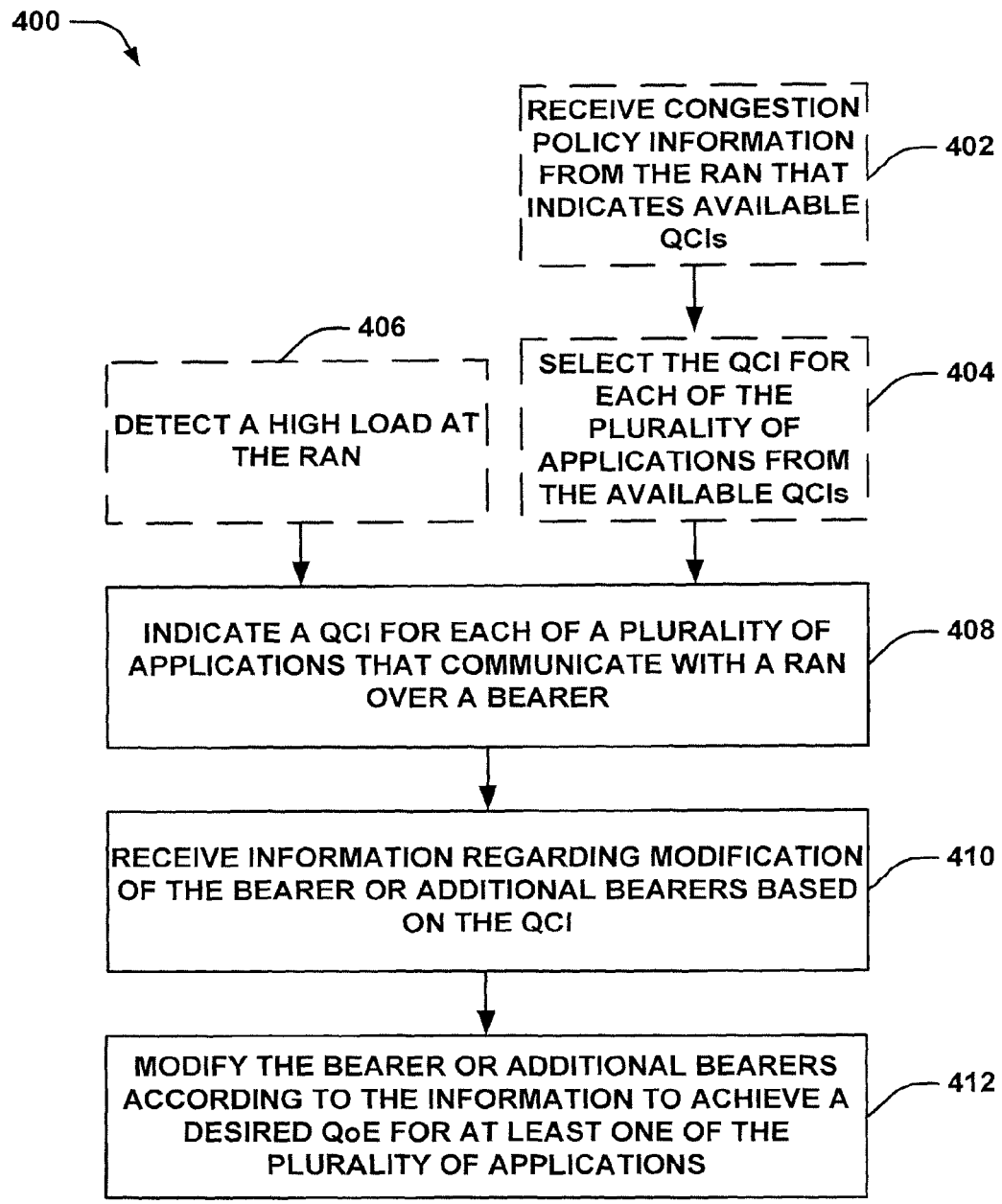
FIG. 4 illustrates an example methodology for modifying one or more bearers to improve QoE for an application.
Figure 5:
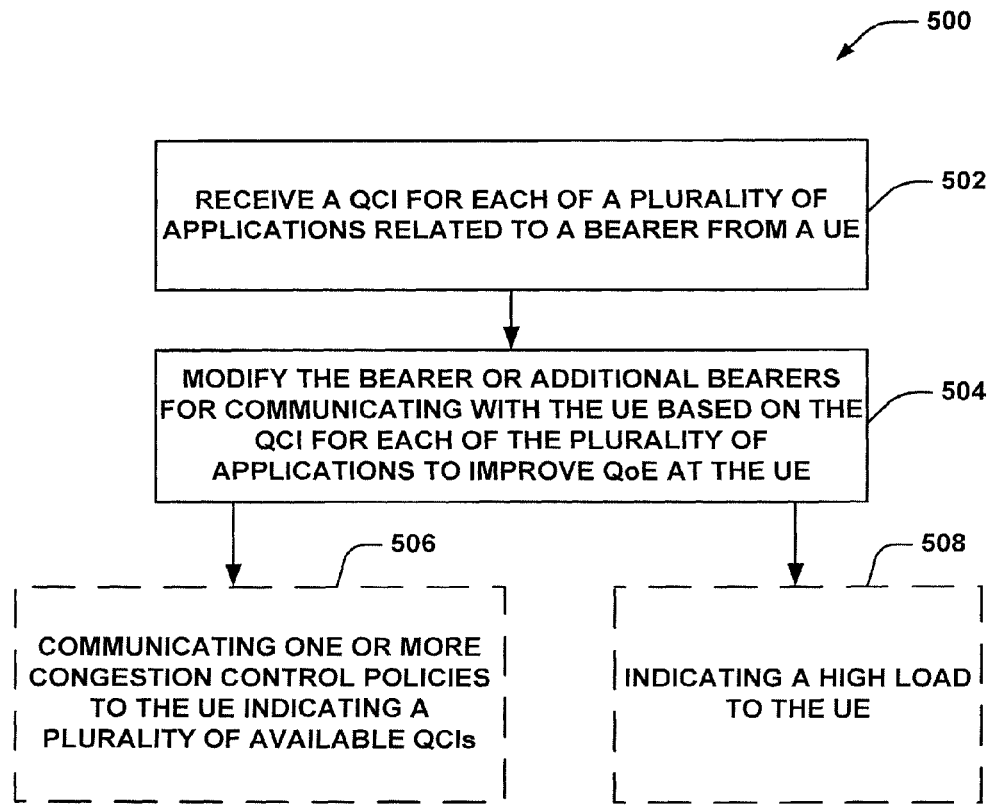
FIG. 5 illustrates an example methodology for causing a device to modify bearers related to one or more applications to improve QoE thereof.

Referring to FIGS. 4-5, example methodologies for improving QoE for applications during RAN congestion are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 4, an example methodology 400 that facilitates modifying bearers to improve QoE of one or more applications in RAN congestion is illustrated.

In an optional aspect, at 402, congestion policy information may be received from the RAN that indicates available QCIs.

Further, in such an optional aspect, at 404, the QCIs can be selected based on one or more policies received from the RAN specifying default QCIs for certain applications, QCIs indicated in subscription information for a UE, and/or the like.

In another optional aspect, at 406, a high load at the RAN may be detected (e.g., based on detecting a degradation in QoE for one or more applications). In an aspect, the high load may be detected by determining a data rate for at least one application below a threshold. In another aspect, the high load may be detected by receiving an indication of the degradation from user or application input.

At 408, a QCI can be indicated for each of a plurality of applications that communicate with a RAN over a bearer. The QCIs can be specified in an attempt to achieve a desired QoE during RAN congestion; for example, applications such as video conferencing, remote audio playback, any application currently being utilized, etc., can have a higher QCI than applications such as FTP file transfer, communication notification systems, etc. In an aspect, QCIs can be indicated according to a user specified policy related to achieving certain QoEs for certain applications, a comparative QoE for multiple applications (e.g., a QoE indicating a preference for video conferencing over FTP transfer), etc. In this example, the QCIs can be indicated based on the detected high load at the RAN.

At 410, information regarding modification of the bearer or additional bearers can be received based on the QCI. This information can specify to modify the bearer to handle additional traffic for improved QCIs or reduce traffic for lesser QCIs, to add bearers for applications with increased QCI, remove bearers for applications with lesser QCIs, and/or the like. The information can be received from the RAN in response to the indicated QCIs. It is to be appreciated that QCIs for the applications can have been previously initialized with the RAN, and the QCIs indicated at 408 modify the QCIs such to effectuate modification of the corresponding resources over which traffic related to the applications is communicated.

At 412, the bearer or additional bearers can be modified according to the information to achieve a desired QoE for at least one of the plurality of applications. For example, according to the information, procedures can be initialized with the RAN for modifying, adding, removing, etc. one or more bearers to handle increased or decreased traffic based on the QCIs.

Turning to FIG. 5, an example methodology 500 is shown for achieving a QoE for one or more applications operating on a UE.

At 502, a QCI can be received for each of a plurality of applications related to a bearer from a UE. The QCIs can be indicative of achieving a desired QoE for the applications when a RAN becomes congested (e.g., data for applications for which a greater QoE is desired or for which a quality is less tolerant to decreases in throughput can be given a higher QCI).

At 504, the bearer or additional bearers can be modified for communicating with the UE based on the QCI for each of the plurality of applications to improve QoE at the UE. This can include modifying parameters for the bearer, initializing a bearer establishment procedure with the UE to establish additional bearers to handle traffic of an application with an increased QCI, removing bearers for applications with a decreased QCI, and/or the like.

In an optional aspect, at 506, one or more congestion control policies can be communicated to the UE. In such an aspect, the one or more congestion control policies may indicate a plurality of available QCIs.

In another optional aspect, at 508, a high load may be indicated to the UE. In such an aspect, the QCI for each of the plurality of applications may be received in response to the high load.

It will be appreciated that, in accordance with one or more aspects described herein, inferences can be made regarding determining a bearer configuration for indicated QCIs to achieve a QoE, and/or the like, as described.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
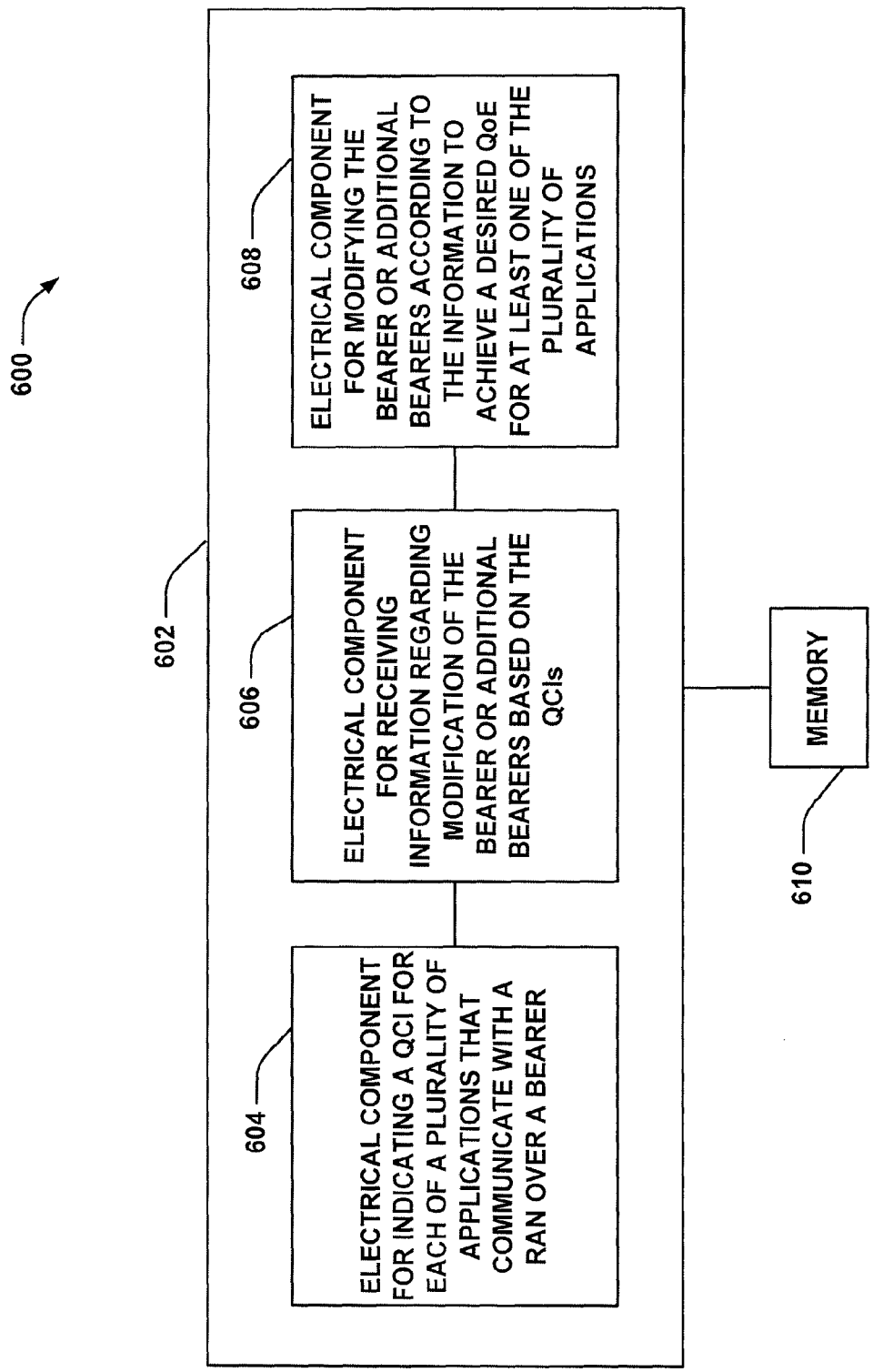
FIG. 6 illustrates an example system that modifies one or more bearers to improve QoE for an application.

Turning now to FIG. 6, an example system 600 is displayed for improving QoE for an application in RAN congestion. For example, system 600 can reside at least partially within a device. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for indicating a QCI for each of a plurality of applications that communicate with a RAN over a bearer 604. As described, this can be based on policies generated at a device, received from a RAN, etc. to indicate a preference for QoE of one application respective to other applications. In addition, the electrical component 604 can indicate the QCIs based on detecting high load at the RAN, as described.

Moreover, logical grouping 602 can include an electrical component for receiving information regarding modification of the bearer or additional bearers based on the QCIs 606. This information can indicate to modify, add, remove, etc. one or more bearers. Logical grouping 602 can also include an electrical component for modifying the bearers or additional bearers according to the information to achieve a desired QoE for at least one of the plurality of applications 608.

Moreover, electrical component 604 can comprise a QCI selecting component 106, electrical component 606 can comprise a resource modification requesting component 110, electrical component 608 can comprise a bearer modifying component 112, etc., in one example. Additionally, system 600 can include a memory 610 that retains instructions for executing functions associated with the electrical components 604, 606, and 608, stores data used or obtained by the electrical components 604, 606, 608, etc. While shown as being external to memory 610, it is to be understood that one or more of the electrical components 604, 606, and 608 can exist within memory 610. In one example, electrical components 604, 606, and 608 can comprise a processing system, or each electrical component 604, 606, and 608 can be a corresponding module of a processing system. Moreover, in an additional or alternative example, electrical components 604, 606, and 608 can be a computer program product including a computer readable medium, where each electrical component 604, 606, and 608 can be corresponding code.

Figure 7:
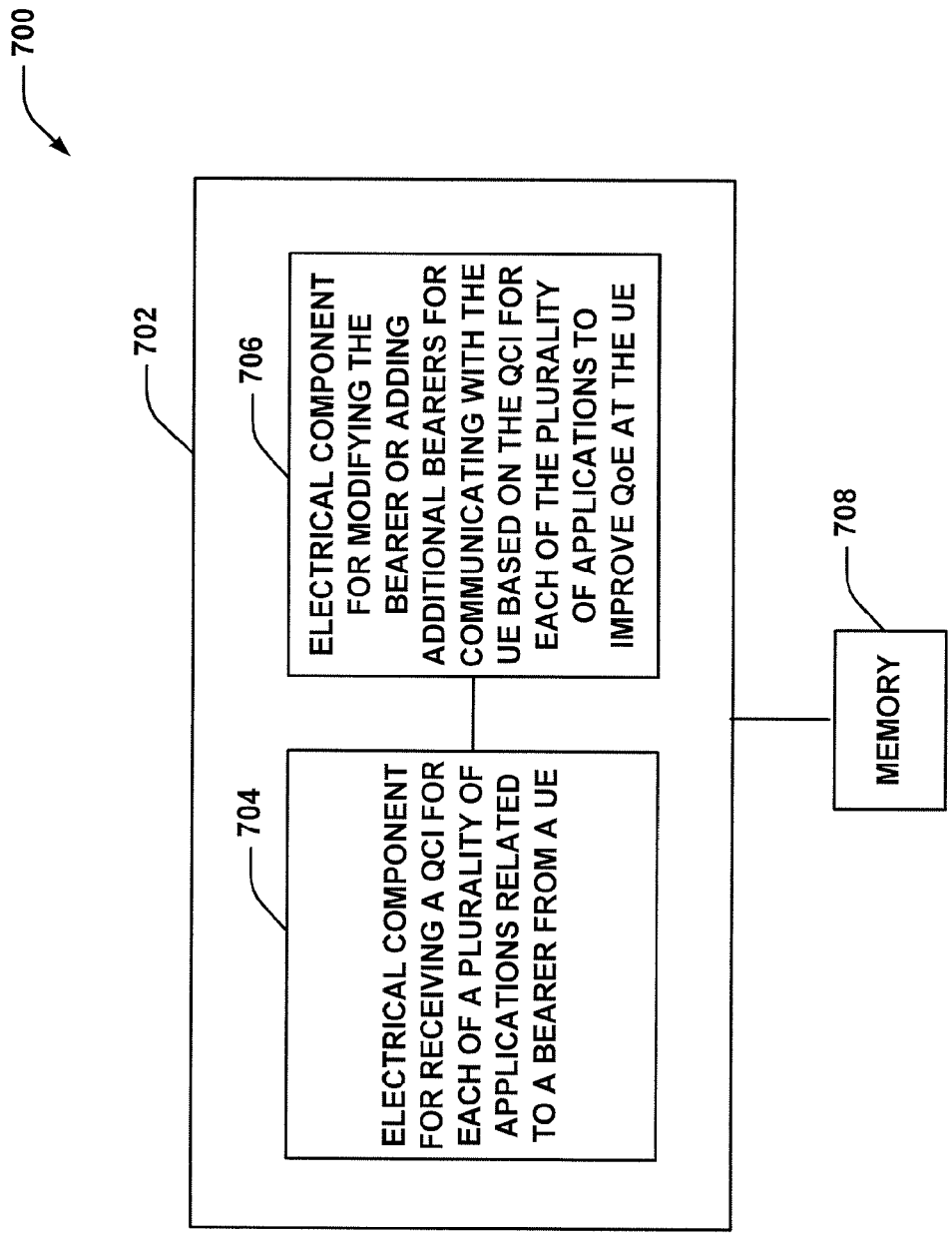
FIG. 7 illustrates an example system that causes a device to modify bearers related to one or more applications to improve QoE thereof.

Turning now to FIG. 7, an example system 700 is displayed for improving QoE for one or more applications at a UE. For example, system 700 can reside at least partially within a network component. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for receiving a QCI for each of a plurality of applications related to a bearer from a UE 704. The QCIs can be modified from a previous QCI to achieve a desired QoE for one or more applications.

Moreover, logical grouping 702 can include an electrical component for modifying the bearer or adding additional bearers for communicating with the UE based on the QCI for each of the plurality of applications to improve QoE at the UE 706. Moreover, electrical components 704 and 706 can comprise a resource modifying component 116 and/or the like, in one example.

Additionally, system 700 can include a memory 708 that retains instructions for executing functions associated with the electrical components 704 and 706, stores data used or obtained by the electrical components 704 and 706, etc. While shown as being external to memory 708, it is to be understood that one or more of the electrical components 704 and 706 can exist within memory 708. In one example, electrical components 704 and 706 can comprise a processing system, or each electrical component 704 and 706 can be a corresponding module of a processing system. Moreover, in an additional or alternative example, electrical components 704 and 706 can be a computer program product including a computer readable medium, where each electrical component 704 and 706 can be corresponding code.

Figure 8:
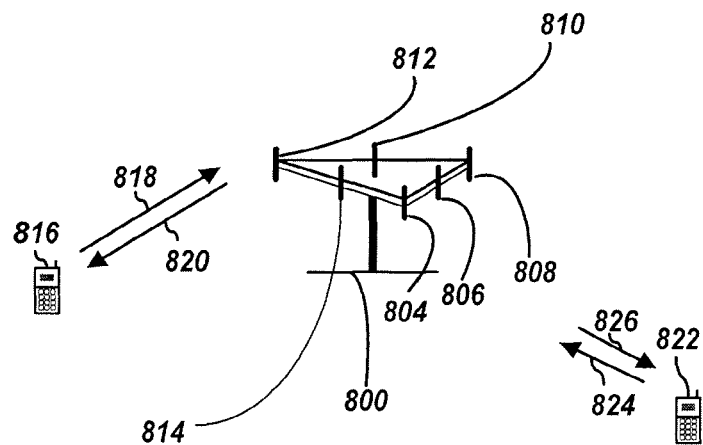
FIG. 8 illustrates a multiple access wireless communication system according to one embodiment.

Referring to FIG. 8, a multiple access wireless communication system according to one embodiment is illustrated. An access point 800 (AP) includes multiple antenna groups, one including 804 and 806, another including 808 and 87, and an additional including 812 and 814. In FIG. 8, only two antennas are shown for each antenna group, however, more or fewer antennas can be utilized for each antenna group. Access terminal 816 (AT) is in communication with antennas 812 and 814, where antennas 812 and 814 transmit information to access terminal 816 over forward link 820 and receive information from access terminal 816 over reverse link 818. Access terminal 822 is in communication with antennas 804 and 806, where antennas 804 and 806 transmit information to access terminal 822 over forward link 826 and receive information from access terminal 822 over reverse link 824. In a FDD system, communication links 818, 820, 824 and 826 can use different frequency for communication. For example, forward link 820 can use a different frequency then that used by reverse link 818.

Each group of antennas and/or the area in which they are designed to communicate is often referred to as a sector of the access point. In the embodiment, antenna groups each are designed to communicate to access terminals in a sector of the areas covered by access point 800.

In communication over forward links 820 and 826, the transmitting antennas of access point 800 utilize beamforming in order to improve the signal-to-noise ratio of forward links for the different access terminals 816 and 822. Also, an access point using beamforming to transmit to access terminals scattered randomly through its coverage causes less interference to access terminals in neighboring cells than an access point transmitting through a single antenna to all its access terminals.

Moreover, access terminals 816 and 822 can provide functionality to improve QoE of one or more applications, as described above.

Figure 9:
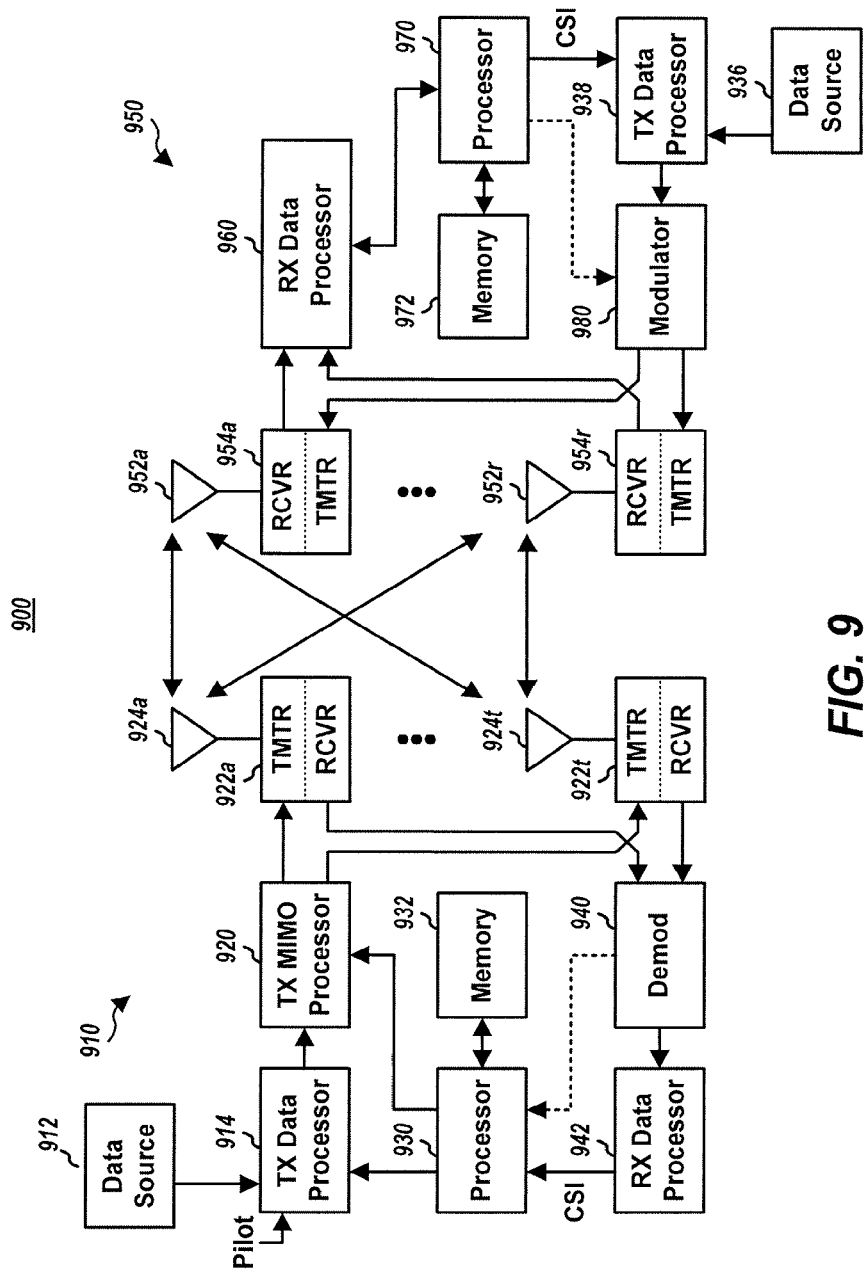
FIG. 9 illustrates a block diagram of a communication system.

FIG. 9 is a block diagram of an embodiment of a transmitter system 910 (also known as the access point) and a receiver system 950 (also known as access terminal) in a MIMO system 900. At the transmitter system 910, traffic data for a number of data streams is provided from a data source 912 to a transmit (TX) data processor 914. In addition, it is to be appreciated that transmitter system 910 and/or receiver system 950 can employ the systems (FIGS. 2, 3, and 6-8) and/or methods (FIGS. 4 and 5) described herein to facilitate wireless communication there between. For example, components or functions of the systems and/or methods described herein can be part of a memory 932 and/or 972 or processors 930 and/or 970 described below, and/or can be executed by processors 930 and/or 970 to perform the disclosed functions.

In an embodiment, each data stream is transmitted over a respective transmit antenna. TX data processor 914 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 930.

The modulation symbols for all data streams are then provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In certain embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 922a through 922t are then transmitted from $N_T$ antennas 924a through 924t, respectively.

At receiver system 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ receivers 954 based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910.

A processor 970 periodically determines which pre-coding matrix to use. Processor 970 formulates a reverse link message comprising a matrix index portion and a rank value portion.

The reverse link message can comprise various types of information regarding the communication link and/or the received data stream. The reverse link message is then processed by a TX data processor 938, which also receives traffic data for a number of data streams from a data source 936, modulated by a modulator 980, conditioned by transmitters 954a through 954r, and transmitted back to transmitter system 910.

At transmitter system 910, the modulated signals from receiver system 950 are received by antennas 924, conditioned by receivers 922, demodulated by a demodulator 940, and processed by a RX data processor 942 to extract the reserve link message transmitted by the receiver system 950. Processor 930 then determines which pre-coding matrix to use for determining the beamforming weights then processes the extracted message.

Processors 930 and 970 can direct (e.g., control, coordinate, manage, etc.) operation at transmitter system 910 and receiver system 950, respectively. Respective processors 930 and 970 can be associated with memory 932 and 972 that store program codes and data. For example, processors 930 and 970 can perform functions described herein with respect to improving QoE for an application at a UE, and/or can operate one or more of the corresponding components. Similarly, memory 932 and 972 can store instructions for executing the functionality or components, and/or related data.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, a processing system may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for improving quality of experience (QoE) in radio access network (RAN) congestion, comprising:
   receiving congestion policy information from a RAN that indicates available quality control indicators (QCI);
   selecting, from the available QCIs, a QCI for each of a plurality of applications executing at a user equipment (UE) that communicate with the RAN over a bearer;
   indicating, by the UE to the RAN, the QCI for each of the plurality of applications;
   receiving, at the UE, information regarding modification of the bearer or additional bearers based on the QCIs; and
   modifying the bearer or additional bearers at the UE according to the information to achieve a desired QoE for at least one of the plurality of applications executing at the UE.

2. The method of claim 1, further comprising detecting, by the UE, a high load at the RAN, wherein the indicating the QCI for each of the plurality of applications is based in part on the detecting the high load.

3. The method of claim 2, wherein the detecting the high load comprises detecting degradation in QoE for at least one application of the plurality of applications.

4. The method of claim 3, wherein the detecting the degradation in QoE comprises determining a data rate for the at least one application below a threshold, or receiving an indication of the degradation from user or application input.

5. The method of claim 3, wherein the indicating comprises indicating the QCI as higher for the at least one application than for at least another one of the plurality of applications to improve QoE at the at least one application.

6. The method of claim 2, wherein the detecting the high load comprises receiving an indication of the high load from the RAN.

7. The method of claim 2, further comprising initializing the QCI for each of the plurality of applications, wherein the indicating the QCI for each of the plurality of applications comprises updating the QCI for each of the plurality of applications as initialized based on the detecting the high load.

8. An apparatus for improving quality of experience (QoE) in radio access network (RAN) congestion, comprising:
   a processing system configured to:
      receive congestion policy information from a RAN that indicates available quality control indicators (QCI);
      select, from the available QCIs, a QCI for each of a plurality of applications executing at the apparatus that communicate with the RAN over a bearer;
      indicate, by the apparatus to the RAN, the QCI for each of the plurality of applications;
      receive, at the apparatus, information regarding modification of the bearer or additional bearers based on the QCIs; and
      modify the bearer or additional bearers at the apparatus according to the information to achieve a desired QoE for at least one of the plurality of applications executing at the apparatus; and
   a memory coupled to the processing system.

9. The apparatus of claim 8, wherein the processing system is further configured to detect, by the apparatus, a high load at the RAN, and wherein the processing system indicates the QCI for each of the plurality of applications based in part on the detecting the high load.

10. The apparatus of claim 9, wherein the processing system detects the high load in part by detecting degradation in QoE for at least one application of the plurality of applications.

11. The apparatus of claim 10, wherein the processing system detects the degradation in QoE at least in part by determining a data rate for the at least one application below a threshold, or receiving an indication of the degradation from user or application input.

12. The apparatus of claim 10, wherein the processing system is further configured to indicate the QCI as higher for the at least one application than for at least another one of the plurality of applications to improve QoE at the at least one application.

13. The apparatus of claim 9, wherein the processing system detects the high load in part by receiving an indication of the high load from the RAN.

14. The apparatus of claim 9, wherein the processing system is further configured to initialize the QCI for each of the plurality of applications, wherein the processing system indicates the QCI for each of the plurality of applications at least in part by updating the QCI for each of the plurality of applications as initialized based on the detecting the high load.

15. An apparatus for improving quality of experience (QoE) in radio access network (RAN) congestion, comprising:
   means for receiving congestion policy information from a RAN that indicates available quality control indicators (QCI);
   means for selecting, from the available QCIs, a QCI for each of a plurality of applications executing at the apparatus that communicate with the RAN over a bearer;
   means for indicating, by the apparatus to the RAN, the QCI for each of the plurality of applications;
   means for receiving, at the apparatus, information regarding modification of the bearer or additional bearers based on the QCIs; and
   means for modifying the bearer or additional bearers at the apparatus according to the information to achieve a desired QoE for at least one of the plurality of applications executing at the apparatus.

16. The apparatus of claim 15, further comprising means for detecting, by the apparatus, a high load at the RAN, and wherein the means for indicating indicates the QCI for each of the plurality of applications based in part on the high load.

17. The apparatus of claim 16, wherein the means for detecting detects the high load in part by detecting degradation in QoE for at least one application of the plurality of applications.

18. The apparatus of claim 17, wherein the means for detecting detects the degradation in QoE at least in part by determining a data rate for the at least one application below a threshold, or receiving an indication of the degradation from user or application input.

19. The apparatus of claim 17, wherein the means for indicating indicates the QCI as higher for the at least one application than for at least another one of the plurality of applications to improve QoE at the at least one application.

20. The apparatus of claim 16, wherein the means for detecting detects the high load in part by receiving an indication of the high load from the RAN.

21. The apparatus of claim 16, further comprising means for initializing the QCI for each of the plurality of applications, wherein the means for indicating indicates the QCI for each of the plurality of applications at least in part by updating the QCI for each of the plurality of applications as initialized based on the detecting the high load.

22. A non-transitory computer-readable medium, comprising:
- code for causing at least one computer to receive congestion policy information from a RAN that indicates available quality control indicators (QCI);
- code for causing the at least one computer to select, from the available QCIs, a QCI for each of a plurality of applications executing at a user equipment (UE) that communicate with the RAN over a bearer;
- code for causing the at least one computer to indicate, by the UE to the RAN, the QCI for each of the plurality of applications;
- code for causing the at least one computer to receive, at the UE, information regarding modification of the bearer or additional bearers based on the QCIs; and
- code for causing the at least one computer to modify the bearer or additional bearers at the UE according to the information to achieve a desired QoE for at least one of the plurality of applications executing at the UE.

23. The non-transitory computer-readable medium of claim 22, further comprising code for causing the at least one computer to detect, by the UE, a high load at the RAN, and wherein the code for causing the at least one computer to indicate indicates the QCI for each of the plurality of applications based in part on the high load.

24. The non-transitory computer-readable medium of claim 23, wherein the code for causing the at least one computer to detect detects the high load in part by detecting degradation in QoE for at least one application of the plurality of applications.

25. The non-transitory computer-readable medium of claim 24, wherein the code for causing the at least one computer to detect detects the degradation in QoE at least in part by determining a data rate for the at least one application below a threshold, or receiving an indication of the degradation from user or application input.

26. The non-transitory computer-readable medium of claim 24, wherein the code for causing the at least one computer to indicate indicates the QCI as higher for the at least one application than for at least another one of the plurality of applications to improve QoE at the at least one application.

27. The non-transitory computer-readable medium of claim 23, wherein the code for causing the at least one computer to detect detects the high load in part by receiving an indication of the high load from the RAN.

28. A method for improving quality of experience (QoE) for one or more user equipments (UE), comprising:
- communicating one or more congestion control policies to a UE indicating a plurality of available quality control indicators (QCI);
- receiving, from the UE, a QCI of the available QCIs for each of a plurality of applications related to a bearer;
- modifying the bearer or adding additional bearers for communicating with the UE based on the QCI for each of the plurality of applications to improve QoE at the UE; and
- communicating, to the UE, information regarding modification of the bearer or additional bearers based on the QCI.

29. The method of claim 28, further comprising indicating a high load to the UE, wherein the QCI for each of the plurality of applications are received in response to the high load.

30. An apparatus for improving quality of experience (QoE) for one or more user equipments (UE), comprising:
- a processing system configured to:
  - communicate one or more congestion control policies to a UE indicating a plurality of available quality control indicators (QCI);
  - receive, from the UE, a QCI of the available QCIs for each of a plurality of applications related to a bearer;
  - modify the bearer or additional bearers for communicating with the UE based on the QCI for each of the plurality of applications to improve QoE at the UE; and
  - communicate, to the UE, information regarding modification of the bearer or additional bearers based on the QCI; and
- a memory coupled to the processing system.

31. The apparatus of claim 30, wherein the processing system is further configured to indicate a high load to the UE, wherein the QCI for each of the plurality of applications are received in response to the high load.

32. An apparatus for improving quality of experience (QoE) for one or more user equipments (UE), comprising:
- means for communicating one or more congestion control policies to a UE indicating a plurality of available quality control indicators (QCI);
- means for receiving, from the UE, a QCI from the available QCIs for each of a plurality of applications related to a bearer;
- means for modifying the bearer or adding additional bearers for communicating with the UE based on the QCI for each of the plurality of applications to improve QoE at the UE; and
- means for communicating, to the UE, information regarding modification of the bearer or additional bearers based on the QCI.

33. The apparatus of claim 32, further comprising means for indicating a high load to the UE, wherein the QCI for each of the plurality of applications are received in response to the high load.

34. A non-transitory computer-readable medium, comprising:
- code for causing at least one computer to communicate one or more congestion control policies to a UE indicating a plurality of available quality control indicators (QCI);
- code for causing the at least one computer to receive, from the UE, a QCI from the available QCIs for each of a plurality of applications related to a bearer;
- code for causing the at least one computer to modify the bearer or additional bearers for communicating with the UE based on the QCI for each of the plurality of applications to improve QoE at the UE; and
- code for causing the at least one computer to communicate, to the UE, information regarding modification of the bearer or additional bearers based on the QCI.

35. The non-transitory computer-readable medium of claim 34, further comprising code for causing the at least one computer to indicate a high load to the UE, wherein the QCI for each of the plurality of applications are received in response to the high load.

* * * * *